Feb. 19, 1963 W. H. McKEE ETAL 3,078,439

CLOSED-ENTRY CONTACT

Filed Jan. 14, 1960

INVENTORS
WILLIAM H. McKEE
LESTER B. JOHNSON
BY John Todd
ATTORNEY 3,078,439
Patented Feb. 19, 1963

3,078,439

CLOSED-ENTRY CONTACT

William H. McKee, Covina, Calif., and Lester B. Johnson, Des Plaines, Ill., assignors to United-Carr Fastener Corporation, Boston, Mass., a corporation of Delaware Filed Jan. 14, 1960, Ser. No. 2,470
4 Claims. (Cl. 339—217)

Figure 1:
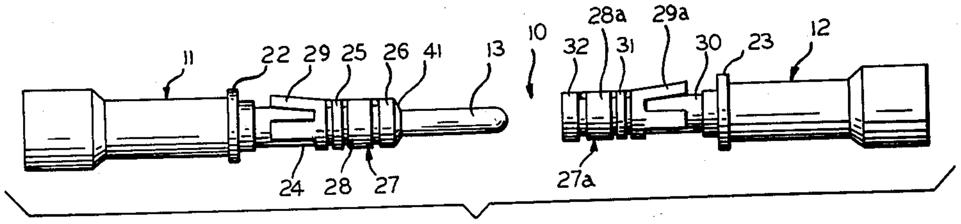

This invention relates to a closed-entry contact structure, and more particularly to a closed-entry snap-in contact structure in which the socket component thereof is provided with resilient means for frictionally engaging the inserted pin component thereof.

A closed-entry contact structure ordinarily forms a part of a connector which comprises a plurality of such contact structures. The connector is formed of insulating material and has two parts, respectively corresponding to the male and female or pin and socket components of the contact structure. When the parts of the connector are brought together, the respective pins of the contact structures are inserted into the mating sockets therefor to make electric connections therebetween. The pin and socket components of each contact structure are connected to leads and such connections, which are usually solder joints, are difficult to make once the components are mounted in the connector. Therefore, it would be advantageous to provide a contact structure in which the mating components thereof can be connected with wire leads prior to the mounting of the components in the connector.

A further aspect of contact structures of this general type is that the pin component thereof must define a firm frictional engagement with the socket component therefor in order for a good electric connection to be made therebetween. In this respect, if means are provided for resiliently interconnecting the pin and socket components with a relatively high-value gripping force, insertion of the pin into the socket becomes difficult and repeated connection and disconnection thereof quickly wears the frictionally engaged members, whereupon the quality of the electrical connection therebetween deteriorates. Therefore, it would be advantageous to provide a contact structure in which a good frictional and electrical interengagement is afforded between the pin and socket components, which does not quickly deteriorate and which does not complicate insertion of the pin into the socket.

In view of the foregoing, an object of this invention is to provide a closed-entry contact structure that achieves the desirable features enumerated. Another object of the invention is in the provision of a closed-entry contact structure in which the mating components thereof can be connected with wire leads prior to the mounting of the components in the connector. Still another object is that of providing a contact structure in which a good frictional and electrical interengagement is afforded between the pin and socket components, which does not quickly deteriorate and which does not complicate insertion of the pin into the socket.

Yet another object is to provide a closed-entry snap-in contact structure in which the pin and socket components thereof are insertable into cavities therefor in a connector block after leads have been soldered or otherwise affixed to the respective components. Still a further object is in the provision of a closed-entry contact structure in which the pin component is steadily gripped by a relatively uniform force during insertion, retention and removal thereof. Still another object is that of providing a closed-entry snap-in contact structure having the relatively uniform force characteristic set forth.

Yet a further object is to provide a closed-entry snap-in contact structure of the character described, in which the snap-in and uniform force features are respectively afforded at least in part by a spring clip fastener having resilient ears for interlocking engagement with a complementary abutment in the connector block, and by a finger that frictionally connects the pin and socket components. Additional objects and advantages of the invention will become apparent as the specification develops.

An embodiment of the invention is illustrated in the accompanying drawing in which—

Figures 2, 3, 4, 5, 6, 7, 8, 9:
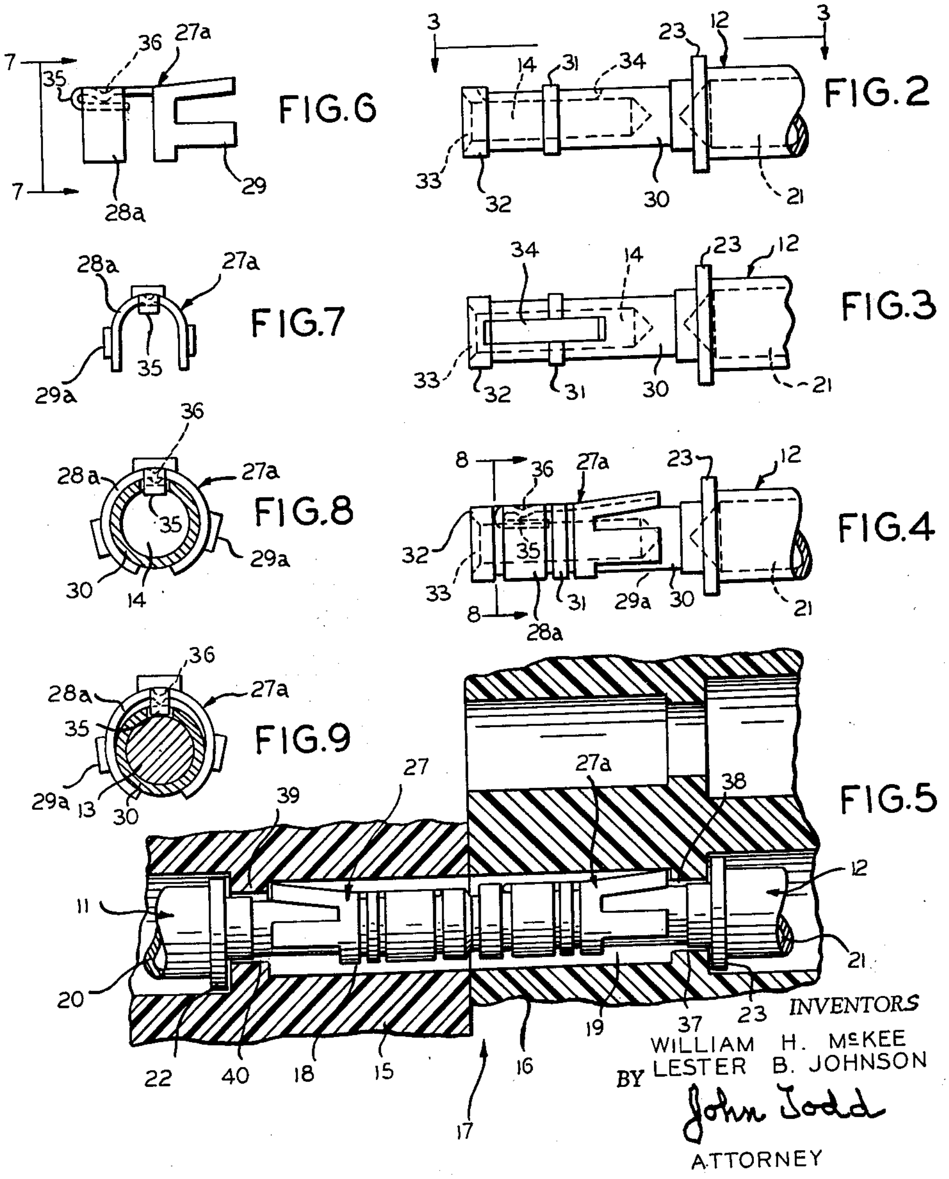

FIGURE 1 is a side view in elevation of a contact structure embodying the invention, and in which the pin and socket components thereof are shown in spaced apart relation; FIGURE 2 is an enlarged, broken side view in elevation of the socket component, but in which the spring clip fastener is removed; FIGURE 3 is an enlarged, broken top plan view of the socket component and is taken along the line 3—3 of FIGURE 2; FIGURE 4 is an enlarged, broken side view in elevation of the socket component, and corresponds to FIGURE 2 except that the spring clip fastener has been included; FIGURE 5 is an enlarged, broken side view in elevation of the socket component as shown in FIGURE 4, but positioned within a connector block; FIGURE 6 is a side view in elevation of the spring clip fastener prior to the mounting thereof on the socket component; FIGURE 7 is an end view in elevation of the spring clip fastener and is taken along the line 7—7 of FIGURE 6; FIGURE 8 is a further enlarged, vertical sectional view taken along the line 8—8 of FIGURE 4; and FIGURE 9 is a vertical sectional view corresponding to that of FIGURE 8, but showing the condition of the spring clip fastener after the pin component of the contact structure is inserted into the socket component thereof.

The contact structure in its entirety is designated with the numeral 10, and comprises a prong or male element 11 and a socket or female component 12. These two components are elongated members, and the component 11 is equipped with a pin or prong 13 adapted to be inserted into an opening or socket 14 provided by the component 12 The structure is formed of metal so as to define an electric connection therebetween when the prong 13 is inserted into the socket 14. The components 11 and 12 are adapted to be respectively positioned in parts 15 and 16 of a connector 17, and such connector is formed of plastic or other insulating material. It is apparent that the connector parts 15 and 16 respectively define cavities 18 and 19 that receive the prong and socket components 11 and 12 therein.

Generally, the connector 17 will be equipped with a plurality of socket structures so that when the parts 15 and 16 are brought together, individual electric connections are established between the components 11 and 12 of the respective contact structures. Necessarily then, the pin and socket components of each contact structure are respectively connected with leads (not shown) and to facilitate such connection, the components are respectively provided with elongated bores 20 and 21 in the outer ends thereof into which such leads are inserted. Thereafter, molten solder is flowed into the bores and mechanically and electrically connects the leads to the components.

Intermediate its ends, the prong component 11 is equipped with an abutment element 22 in the form of an annular flange that projects laterally therefrom; and similarly, the socket component 12 is equipped intermediate its ends with an abutment element 23 in the form of a laterally extending annular flange. Forwardly of the abutment 22 and intermediate it and the prong 13, the axially extending barrel 24 of the component 11 is equipped with a pair of axially spaced stops 25 and 26. Mounted upon the barrel in cooperating relation with the stops 25 and 26 is a fastener 27 provided with a central strap 28 circumjacent the barrel just intermediate the stops 25 and 26. The fastener is also equipped with a plurality of resilient ears 29 that extend outwardly and axially along the barrel. The ears are compressible toward the surface of the barrel 24 to enable the prong component to be inserted into the cavity 18 in the connector part 15.

The socket component 12 is provided with an axially extending barrel 30 having axially spaced stops 31 and 32 positioned therealong which, in the form shown, are annular members extending laterally from the barrel. Mounted upon the barrel 30 in cooperating relation with the stops 31 and 32 is a fastener **27*a* having a central strap 28*a* circumjacent the barrel 30 and a plurality of resilient ears 29*a* that extend outwardly and axially along the barrel 30. The ears 29*a* are compressible inwardly toward the surface of the barrel 30 to permit the socket component to be inserted into the cavity 19 provided therefor in the connector part 16. The annular stop 32 is located at the inner end of the barrel 30, and cooperates therewith to define the close entry into the socket 14. That is to say, the stop 32 and corresponding end portion of the barrel form a continuous ring that is not split or otherwise interrupted along the length thereof, whereupon the entrance into the socket 14 is closed in this sense. Preferably, the mouth or entrance into the socket 14 has a tapered or frusto-conical configuration (as shown at 33) so as to facilitate insertion of the prong 13** thereinto.

The stop 31 is interrupted along one side of the barrel 30 (as shown most clearly in FIGURE 3), and such interruption is located at a slot or elongated, axially extending channel 34 cut in the barrel and which extends laterally therealong. The location of the slot 34 is such that a finger 35 provided by the fastener **27*a* is received therein when the fastener is mounted upon the barrel, as shown most clearly in FIGURES 4, 8 and 9. The finger 35 extends slightly into the interior of the socket 14, as shown in FIGURES 8 and 9, so that it is frictionally engaged by the prong 13** when the prong is inserted into the socket.

Referring to FIGURE 7, it will be seen that the fastener **27*a* has an inverted, generally U-shape prior to the positioning thereof upon the barrel 30 of the socket component 12. The arcuate closed end portion of the fastener, and particularly the strap portion 28*a* thereof, is dimensioned so as to snugly seat upon the barrel 30 intermediate the stops 31 and 32 thereof when the finger 35 is aligned with the slot 34. Following such mounting, the open ends of the strap 28*a* are bent about the barrel whereupon the strap in its entirety is circumjacent the cylindrical barrel. The strap 28*a* defines a spring clip resiliently gripping the barrel, and the necessary resilience may be provided by heat treating the assembly after the fastener is mounted upon the barrel. It should be noted that the fastener at the end portion thereof providing the resilient ears 29*a* is also formed about the barrel 30** so as to be circumjacent thereto, and it also resiliently grips the barrel.

The finger 35 is an integral portion of the fastener **28*a*, and is bent upon itself so that it extends axially along the length of the slot and, consequently, along the length of the socket 14. Further, such axially extending portion of the finger is disposed within the interior of the socket, as noted before. This finger alone cannot be deflected radially outwardly from the axis of the barrel because it is constrained within the position shown by a reinforcing element 36, in the form of a dimple or deformation in the strap 28*a***, which engages the finger.

In mounting the socket component 12 in the cavity 19 therefor in the connector part 16, the component is moved axially from the right to left as viewed in FIGURE 5, and such insertion of the component into the cavity will be effected ordinarily after a lead wire has been soldered in place within the component part 21. It is evident that the cavity 19 intermediate the ends thereof is provided with a stop in the form of an abutment or protuberance 37 that, in the form shown, is an annular inwardly extending flange providing a central opening 38 therethrough. The opening 38 is dimensioned so that the barrel 30 and fastener **27*a* are axially movable therethrough, and such axial movement causes the ears 29*a* to be compressed inwardly toward the surface of the barrel by engagement with the protuberance 37. When the socket component has been displaced axially to the left to a position such that the ears 29*a* have passed completely through the opening 38, the ears snap outwardly and substantially abut one side of the protuberance. Consequently, the socket component cannot be moved axially in one direction in the cavity 19 because of the abutment of the ears 29*a* with the protuberance. At the same time, the abutment element 23 is in substantial engagement with the opposite side of the protuberance 37; and as a result, axial displacement of the socket component 12 in the opposite direction in the cavity 19 is prevented. Therefore, the socket component 12 automatically snaps into place within the cavity 19** by simple insertion of the component thereinto.

Similarly, the connector part 15 has a stop member in the form of a protuberance or abutment 39 defining a central opening 40 therethrough, and the prong component 11 may be snapped into place within the cavity 18 by moving the prong component from left to right, as viewed in FIGURE 5, until the ears 29 abut one side of the protuberance and the abutment element 22 engages the other side of the protuberance.

Since the connector 17 is formed of insulating material and the socket structures 10 are electrically isolated one from another within the connector, a plurality of individual circuit connections may be established when the connector parts 15 and 16 are brought together (as shown in FIGURE 5) to insert the respective prongs 13 of the components 11 into the various sockets 14 of the components 12. As the respective components 11 and 12 are moved toward each other, each prong 13 initially enters the tapered mouth 33 of the socket therefor and is guided into axial alignment with the socket 14. Further insertion of the prong 13 into its socket brings about an engagement of the prong with the finger 35, and an immediate frictional engagement occurs therebetween because the finger 35 has a surface portion thereof aligned within the interior of the socket 14. Therefore, in order for the prong 13 (which has substantially the same outer diameter as the inner diameter of the socket 14) to be moved into the socket, the finger 35 must be displaced radially outwardly.

Such outward displacement of the finger occurs, as shown in FIGURE 9, but the finger by itself is not displaced because deflection thereof is constrained by abutment of the finger with the reinforcing element 36. Rather, as is clearly shown in FIGURE 9, the entire fastener **27*a* is bodily displaced against the resilience of the strap 28*a*, which is a spring clip element tending to maintain itself in circumjacent coaxiality with the barrel 30. Since the finger 35 is in resilient engagement with the prong 13** throughout the subsequent prong insertion, retention and withdrawal, a firm frictional engagement exists between the finger and prong and therefore a good electrical connection therebetween is established and maintained.

The frictional force developed between the finger and prong is of substantially uniform magnitude following initial engagement of the prong with the finger because the fastener **27*a* is further displaced neither radially outwardly nor inwardly throughout a complete cycle of insertion, retention and withdrawal. Furthermore, the initial displacement of the fastener is effected against a substantially uniform-valued force because the resilience of the fastener tending to maintain the same in circumjacent coaxiality with the barrel 30** is approximately constant throughout. That is to say, the incremental displacements of the fastener that necessarily occur in the acceptance of the prong 13 in the socket 14 are characterized by uniform-valued resistance. Therefore, repeated insertion and withdrawal of the prong into and from the socket does not result in a deterioration of the electrical connection established between the prong and finger and between the prong and lower surface portion of the socket, for even after the frictionally engaging surfaces wear, the forces developed therebetween as a result of the resilience of the fastener remain the same.

The fastener 27 may have the same structural and functional characteristics as the fastener 27*a* and may be interchangeable therewith, wherefore the barrel 24 of the prong component 11 has a slot or channel corresponding to that of the slot 34 in the barrel 30 of the socket component so as to seat the fastener finger therein. Preferably, the abutment element 26 adjacent the prong 13 of the component 11 is provided with a tapered shoulder 41 corresponding to the tapered mouth 33 of the socket 14 so as to nest therein, as shown in FIGURE 5.

It will be noted that the arms 28*a* defining the spring clip are elongated and extend substantially around the cylindrical surface of the contact component and together have and arcuate length substantially in excess of 180°. Consequently, the deflection length of each of the arms is quite long and the life cycle of the fastener is maximized. That is, if the flexural length of a component is restricted, fatigue occurs quickly under repeated flexings because all of the flexural stresses are applied to a restricted area. Conversely, if the flexing occurs over an extended length or area, fatigue occurs much less rapidly and the life cycle of the element is increased. The latter situation prevails in the present case because the resilient flexing of the arms appears over a substantial length.

While in the foregoing specification an embodiment of the invention has been disclosed in considerable detail for the purpose of making an adequate disclosure thereof, it will be apparent to those skilled in the art that numerous changes may be made in those details without departing from the spirit and principles of the invention.

We claim:

1. In a contact structure, a longitudinally extending contact component having an axially extending socket adapted to removably receive therein the prong of a complementary contact component, a contact finger disposed within said socket for frictional engagement with such prong, and a fastener having spring arms generally circumjacent said contact component and being operative to resiliently maintain said fastener in a predetermined position while affording lateral displacement thereof relative to said component against the resilient biasing force of said arms, said contact finger being carried by said fastener so that lateral displacement of one effects a corresponding lateral displacement of the other whereby the insertion of such prong into said socket effects such displacement and establishes an electric connection between the contact finger and such prong, said fastener having also a resilient locking ear extending outwardly from said contact component for engagement with a protuberance defined within a cavity of a connector part adapted to receive said contact component therein to limit movement thereof in one direction, said ear being compressible toward said contact component to permit movement thereof past such protuberance in the opposite direction.

2. In a contact structure, a longitudinally extending, generally cylindrical contact component having an axially extending socket adapted to removably receive therein the prong of a complementary contact component, a contact finger disposed within said socket for frictional engagement with such prong, and a fastener having spring arms generally circumjacent said contact component and being operative to resiliently maintain said fastener in a predetermined position while affording lateral displacement thereof relative to said component against the resilient biasing force of said arms, each of said arms being elongated and defining an arcuate deflection length in excess of 90° so as to provide a relatively long life cycle, said contact finger being carried by said fastener so that lateral displacement of one effects a corresponding lateral displacement of the other whereby the insertion of such prong into said socket effects such displacement and establishes an electric connection between the contact finger and such prong, said fastener having also a resilient locking ear extending outwardly from said contact component for engagement with a protuberance defined within a cavity of a connector part adapted to receive said contact component therein to limit movement thereof in one direction, said ear being compressible toward said contact component to permit movement thereof past such protuberance in the opposite direction.

3. In a contact structure, a longitudinally extending contact component having an axially extending socket adapted to removably receive therein the prong of a complementary contact component, said contact component provided with a slot opening into said socket, a contact member reversely bent forming an upper finger portion and a lower finger portion positioned in said slot and having reinforcing means between said upper and lower finger portions intermediate the ends thereof to prevent lateral displacement of said lower finger portion, the lower finger portion being of less length than said upper finger portion and forming a contact finger extending into said socket for frictional engagement with such prong, a fastener member integral with the upper finger portion adjacent the reverse bend portion of said contact member and having spring arms generally circumjacent said contact component and being operative to resiliently maintain said fastener in a predetermined position while permitting lateral displacement thereof relative to said component against the resilient biasing force of said arms, said lower finger portion being associated with said fastener in substantially immovable relationship thereto so that lateral displacement of one effects a corresponding lateral displacement of the other whereby the insertion of a prong into said socket effects such displacement and establishes an electrical connection between the contact finger and the prong, and locking means integral with said upper finger portion adjacent its end remote from the reverse bend portion for engagement within the cavity of a connector part to retain the contact component in assembled relationship with the connector part.

4. In a contact structure, a longitudinally extending contact component having an axially extending socket adapted to removably receive therein the prong of a complementary contact component, said contact component provided with a slot opening into said socket, a contact member reversely bent forming an upper finger portion and a lower finger portion positioned in said slot and having reinforcing means between said upper and lower finger portions intermediate the ends thereof to prevent lateral displacement of said lower finger portion, the lower finger portion being of less length than said upper finger portion and forming a contact finger extending into said socket for frictional engagement with such prong, a fastener member integral with the upper finger portion adjacent the reverse bend portion of said contact member and having spring arms generally circumjacent said contact component and being operative to resiliently maintain said fastener in a predetermined position while permitting lateral displacement thereof relative to said component against the resilient biasing force of said arms, said lower finger portion being associated with said fastener in substantially immovable relationship thereto so that lateral displacement of one effects a corresponding lateral displacement of the other whereby the insertion of a prong into said socket effects such displacement and establishes an electrical connection between the contact finger and the prong, and compressible locking means integral with said upper finger portion adjacent the end remote from the reverse bend end for engagement with a protuberance within a cavity of a connector part to retain the contact component in assembled relationship with the connector part.

References Cited in the file of this patent

UNITED STATES PATENTS 2,513,305 Gagnier et al. ---------- July 4, 1950

2,716,744 Swanson et al. ---------- Aug. 30, 1955

FOREIGN PATENTS 571,900 Great Britain ---------- Sept. 13, 1945

1,188,936 France ---------------- Mar. 16, 1959